United States Patent
Kwon

(10) Patent No.: US 8,961,133 B2
(45) Date of Patent: Feb. 24, 2015

(54) GAS TURBINE ENGINE AND COOLED AIRFOIL

(75) Inventor: Okey Kwon, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 820 days.

(21) Appl. No.: 13/157,420

(22) Filed: Jun. 10, 2011

(65) Prior Publication Data

US 2012/0163994 A1 Jun. 28, 2012

Related U.S. Application Data

(60) Provisional application No. 61/427,714, filed on Dec. 28, 2010.

(51) Int. Cl.
*F01D 5/18* (2006.01)
*F01D 25/12* (2006.01)

(52) U.S. Cl.
CPC .............. *F01D 5/187* (2013.01); *F01D 5/186* (2013.01); *Y02T 50/676* (2013.01)
USPC ....................................... 416/97 R; 415/115

(58) Field of Classification Search
USPC ................ 416/95, 96 A, 96 R, 97 R; 415/115
See application file for complete search history.

(56) References Cited

U.S. PATENT DOCUMENTS

| | | | | |
|---|---|---|---|---|
| 2,873,944 A * | 2/1959 | Wiese et al. | ..................... | 416/92 |
| 2,879,028 A * | 3/1959 | Stalker | ........................ | 416/90 R |
| 3,373,970 A * | 3/1968 | Brockmann | ..................... | 416/92 |
| 3,574,481 A * | 4/1971 | Pyne et al. | ................... | 416/90 R |
| 3,635,587 A * | 1/1972 | Giesman et al. | ............ | 416/97 R |
| 3,806,276 A * | 4/1974 | Aspinwall | ................... | 416/97 R |
| 4,021,139 A * | 5/1977 | Franklin | ..................... | 416/97 R |
| 4,118,146 A * | 10/1978 | Dierberger | ................... | 416/97 A |
| 4,403,917 A * | 9/1983 | Laffitte et al. | ............... | 416/96 A |
| 4,697,985 A * | 10/1987 | Suzuki | ........................ | 416/97 R |
| 5,259,730 A * | 11/1993 | Damlis et al. | ............... | 416/96 A |
| 5,392,515 A * | 2/1995 | Auxier et al. | ............ | 29/889.721 |
| 5,395,212 A | 3/1995 | Anzai et al. | | |
| 5,700,132 A | 12/1997 | Lampes et al. | | |
| 5,752,801 A * | 5/1998 | Kennedy | ........................ | 415/115 |
| 6,168,871 B1 * | 1/2001 | Ritter et al. | ................... | 428/548 |
| 6,769,866 B1 * | 8/2004 | Kannefass et al. | ............ | 415/115 |
| 6,824,360 B2 | 11/2004 | Fleck | | |
| 6,981,840 B2 | 1/2006 | Lee et al. | | |

(Continued)

FOREIGN PATENT DOCUMENTS

| | | |
|---|---|---|
| EP | 1 617 043 A1 | 1/2006 |
| GB | 1 299 904 | 12/1972 |
| WO | WO 00/53896 | 9/2000 |

OTHER PUBLICATIONS

European Search Report, EP 11 25 0947, Rolls-Royce North American Technologies, Inc., May 2, 2012.

*Primary Examiner* — Dwayne J White
*Assistant Examiner* — Joshua R Beebe
(74) *Attorney, Agent, or Firm* — Krieg DeVault LLP

(57) ABSTRACT

An cooled airfoil for a gas turbine engine is disclosed. The airfoil includes an outer wall having a plurality cooling air exit openings and an inner wall having plurality of cooling air inlet openings. A plurality of flow migration dams extend between the inner wall and the outer wall to form a plurality of cooling passages and prevent cooling air from moving radially outward past the migration dams.

20 Claims, 3 Drawing Sheets

(56) References Cited

U.S. PATENT DOCUMENTS

| | | | |
|---|---|---|---|
| 7,080,971 B2 * | 7/2006 | Wilson et al. .................. 416/92 |
| 7,097,425 B2 | 8/2006 | Cunha et al. |
| 7,114,916 B2 | 10/2006 | Dube et al. |
| 7,163,373 B2 | 1/2007 | Liang |
| 7,575,414 B2 | 8/2009 | Lee |
| 7,625,180 B1 | 12/2009 | Liang |
| 7,753,650 B1 * | 7/2010 | Liang ........................ 416/97 R |
| 2009/0104035 A1 | 4/2009 | Abdel-Messeh et al. |

* cited by examiner

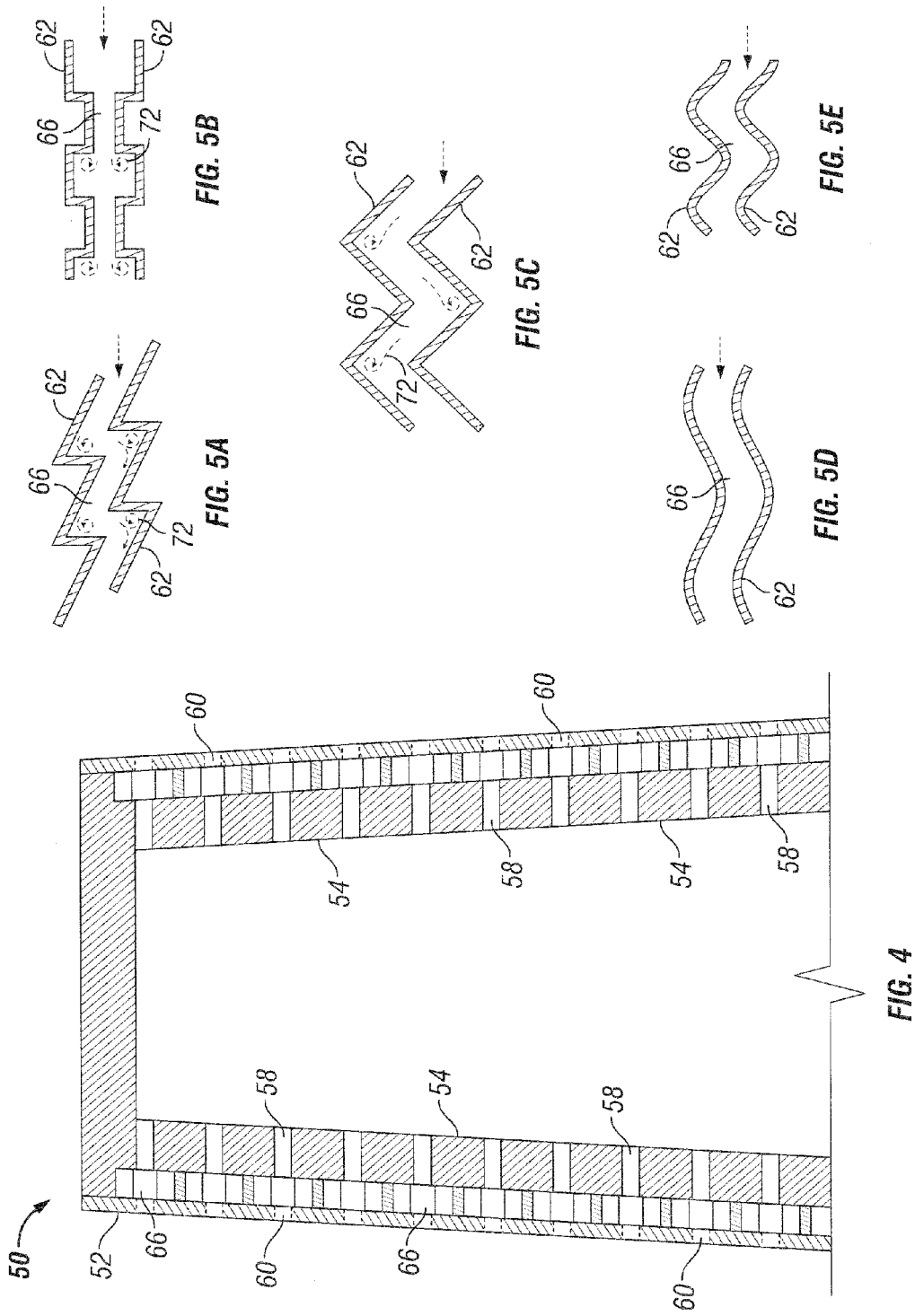

GAS TURBINE ENGINE AND COOLED AIRFOIL

CROSS REFERENCE TO RELATED APPLICATIONS

The present application claims benefit of U.S. Provisional Patent Application No. 61/427,714, filed Dec. 28, 2010, entitled Gas Turbine Engine and Airfoil, which is incorporated herein by reference.

FIELD OF THE INVENTION

The present invention relates to gas turbine engines, and more particularly, to airfoils for gas turbine engines.

BACKGROUND

Gas turbine engine airfoils, particularly those that require cooling, remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique turbine engine airfoil. Other embodiments include apparatuses, systems, devices, hardware, methods, and combinations for gas turbine engines and airfoils with a unique cooling passage. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 4 illustrates some aspects of a non-limiting example of a cross section of the airfoil of FIG. 2.

FIGS. 5A-5E illustrate some aspects of a non-exhaustive group of non-limiting examples of different rib designs in accordance with embodiments of the present invention.

DETAILED DESCRIPTION

Figure 1:
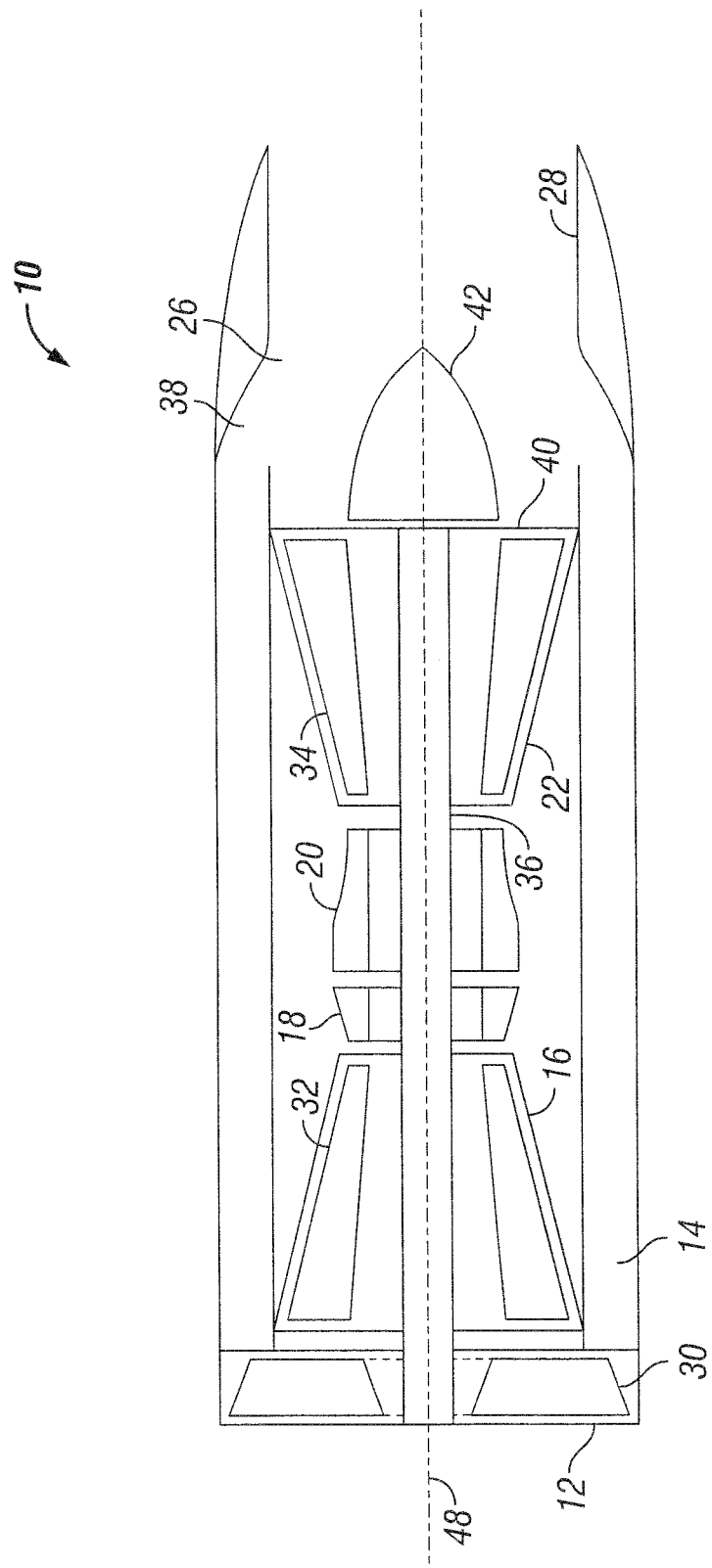
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, a non-limiting example of some aspects of a gas turbine engine 10 in accordance with an embodiment of the present invention is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine.

As a turbofan engine, gas turbine engine 10 includes a fan system 12, a bypass duct 14, a compressor system 16, a diffuser 18, a combustion system 20, a turbine system 22, a discharge duct 26 and a nozzle 28. Bypass duct 14 and compressor system 16 are in fluid communication with fan system 12. Diffuser 18 is in fluid communication with compressor system 16. Combustion system 20 is fluidly disposed between compressor system 16 and turbine system 22. In one form, combustion system 20 includes a combustion liner (not shown) that contains a continuous combustion process. In other embodiments, combustion system 20 may take other forms, and may be, for example, a wave rotor combustion system, a rotary valve combustion system, or a slinger combustion system, and may employ deflagration and/or detonation combustion processes.

Fan system 12 includes a fan rotor system 30. In various embodiments, fan rotor system 30 includes one or more rotors (not shown) that are powered by turbine system 22. Bypass duct 14 is operative to transmit a bypass flow generated by fan system 12 to nozzle 28. Compressor system 16 includes a compressor rotor system 32. In various embodiments, compressor rotor system 32 includes one or more rotors (not shown) that are powered by turbine system 22. Each compressor rotor includes a plurality of compressor blades (not shown). Turbine system 22 includes a turbine rotor system 34. In various embodiments, turbine rotor system 34 includes one or more rotors (not shown) operative to drive fan rotor system 30 and compressor rotor system 32. Each turbine rotor includes a plurality of turbine blades (not shown) Turbine rotor system 34 is drivingly coupled to compressor rotor system 32 and fan rotor system 30 via a shafting system 36. In various embodiments, shafting system 36 includes a plurality of shafts that may rotate at the same or different speeds and directions. In some embodiments, only a single shaft may be employed. Turbine system 22 is operative to discharge an engine 10 core flow to nozzle 28. In one form, fan rotor system 30, compressor rotor system 32, turbine rotor system 34 and shafting system 36 rotate about an engine centerline 48. In other embodiments, all or parts of fan rotor system 30, compressor rotor system 32, turbine rotor system 34 and shafting system 36 may rotate about one or more other axes of rotation in addition to or in place of engine centerline 48.

Discharge duct 26 extends between a discharge portion 40 of turbine system 22 and engine nozzle 28. Discharge duct 26 is operative to direct bypass flow and core flow from a bypass duct discharge portion 38 and turbine discharge portion 40, respectively, into nozzle system 28. In some embodiments, discharge duct 26 may be considered a part of nozzle 28. Nozzle 28 in fluid communication with fan system 12 and turbine system 22. Nozzle 28 is operative to receive the bypass flow from fan system 12 via bypass duct 14, and to receive the core flow from turbine system 22, and to discharge both as an engine exhaust flow, e.g., a thrust-producing flow.

During the operation of gas turbine engine 10, air is drawn into the inlet of fan 12 and pressurized by fan 12. Some of the air pressurized by fan 12 is directed into compressor system 16 as core flow, and some of the pressurized air is directed into bypass duct 14 as bypass flow, and is discharged into nozzle 28 via discharge duct 26. Compressor system 16 further pressurizes the portion of the air received therein from fan 12, which is then discharged into diffuser 18. Diffuser 18 reduces the velocity of the pressurized air, and directs the diffused core airflow into combustion system 20. Fuel is mixed with the pressurized air in combustion system 20, which is then combusted. The hot gases exiting combustor 20 are directed into turbine system 22, which extracts energy in the form of mechanical shaft power sufficient to drive fan system 12 and compressor system 16 via shafting system 36. The core flow exiting turbine system 22 is directed along an engine tail cone 42 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Compressor rotor system 32 includes a plurality of blades and vanes (not shown) employed to add energy to the gases prior to combustion. Turbine rotor system 34 includes a plurality of blades and vanes (not shown) employed to extract energy from the high temperature high pressure gases in the flowpath. It is desirable to maintain the temperature of blades and vanes within certain temperature limits, e.g., based on the materials and coatings employed in the blades and vanes. In many cases, blades and vanes are cooled by injecting cooling air into the blade or vane. The blades rotate with the corresponding rotor during the operation of engine 10, which may increase the degree of difficulty in cooling the blade because the cooling air tends to migrate radially outward due to centrifugal force. Embodiments of the present invention includes an airfoil configured to mitigate and/or prevent the migration of cooling air due to centrifugal loading.

Figure 2:
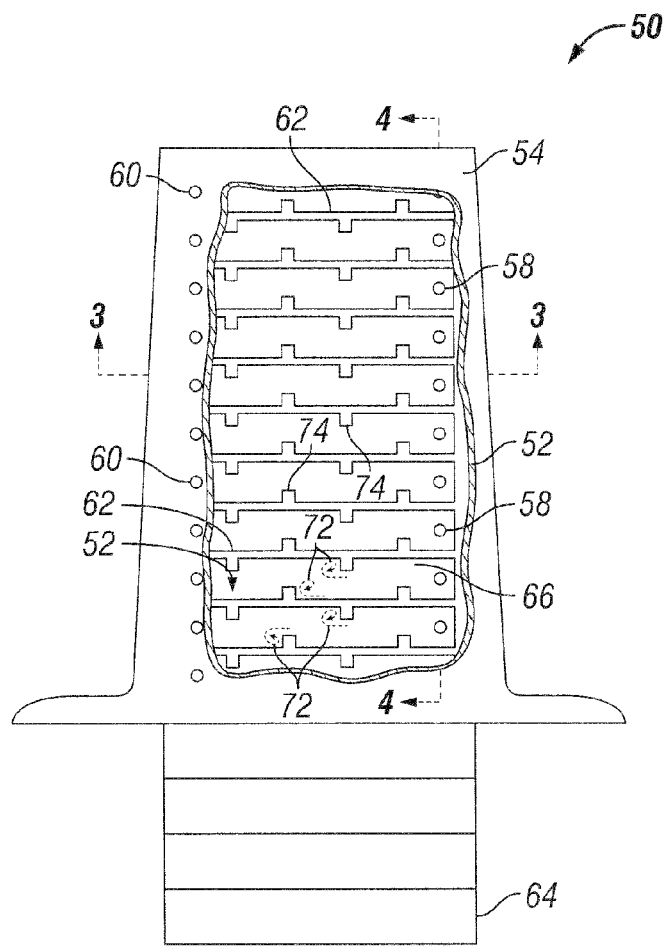
FIG. 2 illustrates some aspects of a non-limiting example of an airfoil in accordance with an embodiment of the present invention.
Figure 3:
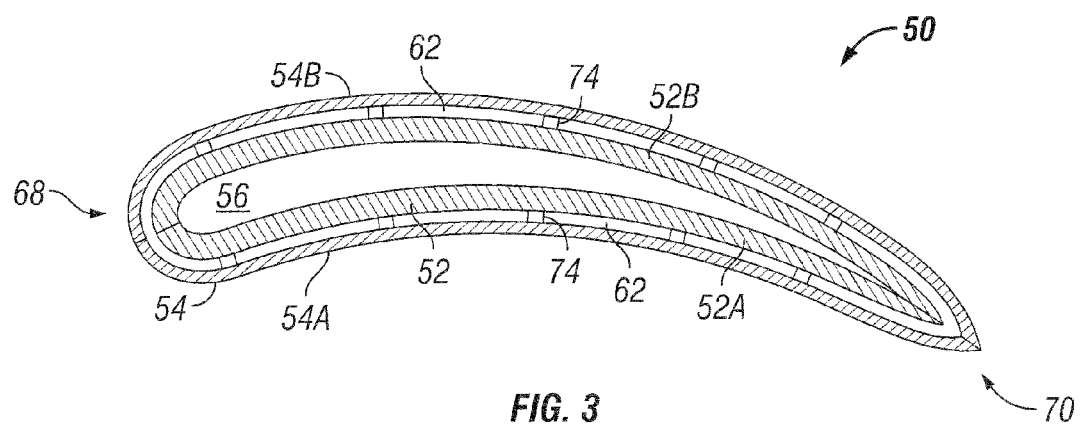
FIG. 3 illustrates some aspects of a non-limiting example of a cross section of the airfoil of FIG. 2.

Referring to FIGS. 2-4, a non-limiting example of some aspects of an airfoil 50 in accordance with an embodiment of the present invention is depicted. In one form, airfoil 50 is a turbine blade. In other embodiments, airfoil 50 may be a compressor blade. In still other embodiments, airfoil 50 may be a turbine or compressor vane. In one form, airfoil 50 is a dual wall airfoil. In other embodiments, airfoil 50 may be a single wall airfoil or an airfoil having more than two walls. Airfoil 50 includes a spar 52 and an outer skin 54. In one form, airfoil 50 is formed of a conventional aerospace material, such as CMSX-4, available from Cannon Muskegon Corporation of Muskegon, Mich., USA. In other embodiments, other materials, conventional or otherwise, may be employed.

In one form, spar 52 is hollow, having an internal volume that forms a cooling air supply passage 56. In other embodiments, one or more other cooling air supply passages may be employed in addition to or in place of cooling air supply passage 56. In other embodiments, cooling air supply passage 56 may be positioned adjacent to an inner wall other than spar 52. Spar 52 includes a plurality of cooling air inlet openings 58 extending through the wall of spar 52. Cooling air supply passage 56 is in fluid communication with cooling air inlet openings 58. Cooling air supply passage 56 is operative to supply cooling air to cooling air inlet openings 58.

Outer skin 54 forms an outer wall for airfoil 50 on both the pressure side and the suction side of airfoil 50. In one form, outer skin 54 extends around both the pressure side and the suction side. In other embodiments, outer skin 54 may be in the form of individual sheets, e.g., one outer wall for each of the pressure side and the suction side of airfoil 50, e.g., illustrated in FIG. 3 as an outer wall 54A for the pressure side, and an outer wall 54B for the suction side. Similarly, in one form, spar 52 extends around both the pressure side and the suction side. In other embodiments, spar 52 may be in the form of individual structures, e.g., one inner wall for each of the pressure side and the suction side of airfoil 50, e.g., illustrated in FIG. 3 as an inner wall 52A for the pressure side, and an inner wall 52B for the suction side.

Outer skin 54 includes a plurality of cooling air exit openings 60. Spar 52 forms an inner wall for airfoil 50 on both the pressure side and the suction side of airfoil 50. Outer skin 54 and spar 52 are spaced apart from each other by a plurality of ribs 62. In one form, ribs 62 extend between the outer wall formed by outer skin 54 and the inner wall formed by spar 52. In other embodiments, ribs 62 may extend between other walls in addition to or in place of outer skin 54 and spar 52. In one form, ribs 62 form a plurality of flow migration dams configured to reduce or prevent cooling air flow migration in a radially outward direction, e.g., due to centrifugal force during the rotation of airfoil 50 in the form of a turbine engine blade. In one form, ribs 62 are oriented horizontally in airfoil 50. In other embodiments, ribs 62 may be oriented in other directions in addition to or in place of horizontal. In one form, airfoil 50 may have an attachment feature 64 configured to mechanically couple airfoil 50 to engine 10. In one form, attachment feature 64 is operative to deliver cooling air to cooling air supply passage 56.

Each adjacent pair of ribs 62 form therebetween a cooling passage 66. In one form, ribs 52 and cooling passages 66 are formed on both the pressure side and the suction side of airfoil 50. In other embodiments, ribs 52 and cooling passages 66 may be formed only on either the pressure side or the suction side of airfoil 50. In some embodiments, cooling passages 66 may also be formed between ribs 62 and end structures of airfoil 50, e.g., at the root and tip of airfoil 50 (not shown). In one form, cooling passages 66 are bound by adjacent pairs of ribs 62 and by outer skin 54 and spar 52. In other embodiments, cooling passages 66 may be bound by other walls in addition to ribs 62. Cooling passages 66 are in fluid communication with cooling air inlet openings 58 and with cooling air exit openings 60. In one form, each cooling passage 66 is in fluid communication with cooling air inlet openings 58 at one end, and with cooling air exit openings 60 at the opposite end. In other embodiments, cooling passages 66, cooling air inlet openings 58 and cooling air exit openings 60 may be arranged otherwise. In one form, each cooling passage 66 adjacent to and in fluid communication with a single cooling air inlet opening 58 and with a single cooling air exit opening 60 and operative to receive cooling air from the single cooling air inlet opening 58 and the single cooling air exit opening 60. In other embodiments, each cooling passage 66 may be adjacent to and in fluid communication with a plurality of cooling air inlet openings 58 and/or a plurality of cooling air exit openings 60.

During engine 10 operation, cooling air is delivered from cooling air supply passage 56 to cooling passages 66 via cooling air inlet openings 58. The cooling air exits cooling passages 66 via cooling air exit openings 60. In one form, cooling passages 66 are operative to flow cooling air to remove heat from outer skin 54 and spar 52. In one form, cooling passages 66 extend continuously between the leading edge portion 68 of airfoil 50 and the trailing edge portion 70 of airfoil 50. In other embodiments, cooling passages 66 may not extend continuously between leading edge portion 68 and trailing edge portion 70.

In one form, ribs 62 are configured to form vortexes 72 in cooling passages 66. In a particular form, ribs 62 are configured to form a series of vortexes 72 in cooling passages 66. In one form, ribs 62 are configured to form vortexes on each side of cooling passages 66. e.g., the top and bottom of each cooling passage 66. In other embodiments, ribs 62 may not be configured to form vortexes in cooling passages 66. In one form, ribs 62 include a plurality of trip strips (turbulators) 74 extending from ribs 62 into cooling passages 66. Trip strips 74 are configured to generate vortexes in the cooling air passing through cooling passages 66. In other embodiments, trip strips 74 may not extend from ribs 62, e.g., may be otherwise formed or extend within cooling passages 66.

In other embodiments, ribs 62 may be configured to form vortexes by virtue of having a particular shape, e.g., yielding a tortuous flowpath shape of cooling passages 66, non-limiting examples of which are illustrated in FIGS. 5A-5E. Other shapes may be employed in other embodiments.

Embodiments of the present invention include an airfoil for a gas turbine engine, comprising: an outer wall having a plurality cooling air exit openings; an inner wall spaced apart from the outer wall, wherein the inner wall has a plurality of cooling air inlet openings; a plurality of flow migration dams, wherein the flow migration dams extend between the inner wall and the outer wall, the plurality of flow migration dams forming therebetween a plurality of cooling passages, wherein the cooling passages are in fluid communication with the cooling air inlet openings and with the cooling air exit openings; and a cooling air supply passage in fluid communication with the cooling air inlet openings, wherein the cooling air supply passage is operative to supply cooling air to the cooling air inlet openings.

In a refinement, the airfoil further comprises a one or more trip strips in one or more cooling passages configured to generate one or more vortexes.

In another refinement, the one or more trip strips extend from the flow migration dams.

In yet another refinement, the one or more trip strips include a series of trip strips in each cooling passage, wherein the series of trip strips is configured to generate a series of vortexes in each cooling passage.

In still another refinement, the one or more trip strips extend from the flow migration dams.

In yet still another refinement, the migration dams are oriented horizontally.

In a further refinement, the cooling passages each have a first end and a second end opposite the first end, and wherein the cooling passages are in fluid communication with the cooling air inlet openings at the first ends, and in fluid communication with the cooling air exit openings at the second ends.

In a yet further refinement, the flow migration dams are configured to reduce cooling air flow migration in a radially outward direction due to centrifugal force.

In a still further refinement, the cooling air supply passage is disposed adjacent to the inner wall.

In a yet still further refinement, the inner wall forms a spar for the airfoil.

In an additional refinement, the airfoil is configured as a dual wall airfoil.

In another additional refinement, the outer wall and the inner wall are disposed on a pressure side of the airfoil, further comprising: a second outer wall disposed on a suction side of the airfoil, the second outer wall having a second plurality cooling air exit openings; a second inner wall disposed on a suction side of the airfoil and spaced apart from the second outer wall, wherein the second inner wall has a second plurality of cooling air inlet openings; a second plurality of flow migration dams, wherein the flow migration dams extend between the second inner wall and the second outer wall, the second plurality of flow migration dams forming therebetween a second plurality of cooling passages, wherein the second cooling passages are in fluid communication with the second cooling air inlet openings and with the second cooling air exit openings, wherein the cooling air supply passage is disposed between the inner wall and the second inner wall, and is in fluid communication with the second cooling air inlet openings, wherein the cooling air supply passage is operative to supply cooling air to the second cooling air inlet openings.

In yet another additional refinement, the airfoil has a leading edge portion and a trailing edge portion; and wherein the flow migration dams extend continuously between the leading edge portion and the trailing edge portion.

Embodiments include a turbine engine, comprising: an airfoil, the airfoil including: a hollow spar structure having a plurality of cooling air inlet openings, wherein an internal volume in the hollow spar structure forms a cooling air supply passage operative to deliver cooling air to the cooling air inlet openings; an outer skin spaced apart from the hollow spar structure by a plurality of ribs, wherein the plurality of ribs form a plurality of cooling passages, each cooling passage being defined between an adjacent pair of ribs, wherein the cooling air inlet openings are in fluid communication with the cooling passages; and wherein the outer skin includes a plurality of cooling air exit openings in fluid communication with the plurality of cooling passages.

In a refinement, the ribs are configured to form vortexes in the cooling passages.

In another refinement, the ribs are configured to form a series of vortexes in each cooling passage.

In yet another refinement, the ribs are configured to form vortexes on each side of the cooling passages.

In still another refinement, one or more ribs include one or more trip strips extending from the one or more ribs, and wherein the one or more trip strips are configured to generate one or more vortexes.

In a further refinement, the ribs are configured to prevent a migration of flow of cooling air between the hollow spar structure and the outer skin in a radial direction.

Embodiments of the present invention include an airfoil for a turbine engine, comprising: an outer wall having a plurality cooling air exit openings; an inner wall spaced apart from the outer wall, wherein the inner wall has a plurality of cooling air inlet openings; a cooling air supply passage in fluid communication with the cooling air inlet openings, wherein the cooling air supply passage is operative to supply cooling air to the cooling air inlet openings, and means for cooling the outer wall without allowing flow migration in a radially outward direction, wherein the means for cooling is in fluid communication with both the cooling air inlet openings and the cooling air exit openings.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An airfoil having a leading edge and a trailing edge for a gas turbine engine, comprising:
an outer wall having a plurality of cooling air exit openings;
an inner wall spaced apart from the outer wall, wherein the inner wall has a plurality of cooling air inlet openings;
a plurality of flow migration dams, wherein the flow migration dams extend between the inner wall and the outer wall, the plurality of flow migration dams forming therebetween a plurality of cooling passages, wherein the cooling passages are in fluid communication with the cooling air inlet openings and with the cooling air exit openings;
a cooling air supply passage in fluid communication with the cooling air inlet openings, wherein the cooling air supply passage is operative to supply cooling air to the cooling air inlet openings; and
wherein each of the cooling passages formed by the flow migration dams includes a single cooling air inlet opening positioned proximate one of the leading edge and the trailing edge of the airfoil and a single cooling air exit opening positioned proximate the other of one of the leading edge and trailing edge of the airfoil opposite of the cooling air inlet opening and further includes one or more trip strips positioned between the cooling air inlet opening and the cooling air exit opening, each inlet and outlet opening oriented transverse to the cooling passage.

2. The airfoil of claim 1, wherein the one or more trip strips are configured to generate one or more vortexes.

3. The airfoil of claim 1, wherein the one or more trip strips extend from the flow migration dams.

4. The airfoil of claim 1, wherein the one or more trip strips include a series of trip strips in each cooling passage, wherein the series of trip strips is configured to generate a series of vortexes in each cooling passage.

5. The airfoil of claim 1, wherein the flow migration dams are oriented horizontally.

6. The airfoil of claim 1, wherein the cooling passages each have a first end and a second end opposite the first end, and wherein the cooling passages are in fluid communication with the cooling air inlet openings at the first ends, and in fluid communication with the cooling air exit openings at the second ends.

7. The airfoil of claim 1, wherein the flow migration dams are configured to reduce cooling air flow migration in a radially outward direction due to centrifugal force.

8. The airfoil of claim 1, wherein the cooling air supply passage is disposed adjacent to the inner wall.

9. The airfoil of claim 1, wherein the inner wall forms a spar for the airfoil.

10. The airfoil of claim 1, configured as a dual wall airfoil.

11. The airfoil of claim 1, wherein the outer wall and the inner wall are disposed on a pressure side of the airfoil, further comprising:
a second outer wall disposed on a suction side of the airfoil, the second outer wall having a second plurality of cooling air exit openings;
a second inner wall disposed on a suction side of the airfoil and spaced apart from the second outer wall, wherein the second inner wall has a second plurality of cooling air inlet openings;
a second plurality of flow migration dams, wherein the flow migration dams extend between the second inner wall and the second outer wall, the second plurality of flow migration dams forming therebetween a second plurality of cooling passages, wherein the second cooling passages are in fluid communication with the second cooling air inlet openings and with the second cooling air exit openings,
wherein the cooling air supply passage is disposed between the inner wall and the second inner wall, and is in fluid communication with the second cooling air inlet openings, wherein the cooling air supply passage is operative to supply cooling air to the second cooling air inlet openings.

12. The airfoil of claim 1, wherein the flow migration dams extend continuously between the leading edge and the trailing edge of the airfoil.

13. The airfoil of claim 1, wherein the flow migration dams are configured to form one or more vortexes along a length thereof.

14. A turbine engine, comprising:
an airfoil having a leading edge and a trailing edge, the airfoil including:
a hollow spar structure having a plurality of cooling air inlet openings, wherein an internal volume in the hollow spar structure forms a cooling air supply passage operative to deliver cooling air to the cooling air inlet openings;
an outer skin spaced apart from the hollow spar structure by a plurality of ribs, wherein the plurality of ribs form a plurality of cooling passages, each cooling passage being defined between an adjacent pair of ribs, wherein the cooling air in each of the plurality of cooling passages is prevented from flowing radially past either of the adjacent pair of ribs;
wherein the cooling air inlet openings are in fluid communication with the cooling passages;
wherein the outer skin includes a plurality of cooling air exit openings in fluid communication with the plurality of cooling passages;
wherein each of the cooling passages formed by the adjacent pair of ribs includes a cooling air inlet opening positioned proximate one of the leading edge and the trailing edge of the airfoil and a cooling air exit opening positioned toward the other of one of the leading and trailing edges opposite of the cooling air inlet opening, wherein a radial height of the inlet opening and a radial height of the exit opening are each less than a radial height of the cooling passage defined by the adjacent pair of ribs and wherein cooling air generally flows in one direction through the passages between the cooling air inlet openings and the cooling air exit openings.

15. The airfoil of claim 14, wherein each cooling passage further includes one or more vortex generating features positioned between the cooling air inlet opening and the cooling air exit opening.

16. The airfoil of claim 15, wherein the vortex generating feature is formed by at least one of the ribs in each cooling passage.

17. The airfoil of claim 15, wherein each rib of an adjacent pair of ribs are configured to form vortexes on each side of the cooling passages.

18. The airfoil of claim 15, wherein one or more ribs include one or more trip strips extending from the one or more ribs and positioned between the cooling air inlet opening and the cooling air exit opening, and wherein the one or more trip strips are configured to generate one or more vortexes.

19. The airfoil of claim 14, wherein the ribs are configured to prevent a migration of flow of cooling air between the hollow spar structure and the outer skin in a radial direction past any of the plurality of ribs.

20. An airfoil for a turbine engine, comprising:
an outer wall having a plurality of cooling air exit openings;
an inner wall spaced apart from the outer wall, wherein the inner wall has a plurality of cooling air inlet openings;
a cooling air supply passage in fluid communication with the cooling air inlet openings, wherein the cooling air supply passage is operative to supply cooling air to the cooling air inlet openings,
a plurality of flow migration dams extending between the inner wall and the outer wall, the plurality of flow migration dams forming a plurality of cooling flow channels therebetween, wherein the cooling flow channels are in fluid communication with the cooling air inlet openings and the cooling air exit openings; and
wherein at least one of the flow migration dams includes variable portions that alternate between a radially inward and a radial outward orientation along a length thereof and wherein the at least one flow migration dam forms one of a top or bottom of one cooling flow channel and the other of a top or bottom of an adjacent cooling flow channel.

* * * * *